(12) United States Patent
Larsen et al.

(10) Patent No.: US 8,310,074 B2
(45) Date of Patent: Nov. 13, 2012

(54) METHOD AND APPARATUS FOR GENERATING POWER IN A WIND TURBINE

(75) Inventors: Einar Vaughn Larsen, Ballston Lake, NY (US); Anthony Michael Klodowski, Hardy, VA (US); Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 467 days.

(21) Appl. No.: 12/609,824

(22) Filed: Oct. 30, 2009

(65) Prior Publication Data

US 2011/0101689 A1    May 5, 2011

(51) Int. Cl.
*H02P 9/48* (2006.01)
*H02P 9/10* (2006.01)
(52) U.S. Cl. ............................................. 290/44; 290/55
(58) Field of Classification Search ............... 290/44, 290/45, 50, 55; 322/35
See application file for complete search history.

(56) References Cited

U.S. PATENT DOCUMENTS

| | | | |
|---|---|---|---|
| 5,798,631 A * | 8/1998 | Spee et al. | 322/25 |
| 7,411,309 B2 | 8/2008 | Hudson | |
| 7,425,771 B2 | 9/2008 | Rivas et al. | |
| 8,008,793 B2 * | 8/2011 | Andresen | 290/44 |
| 8,013,461 B2 * | 9/2011 | Delmerico et al. | 290/44 |
| 8,097,971 B2 * | 1/2012 | Ichinose et al. | 290/44 |
| 2009/0121482 A1 | 5/2009 | Rickard | |
| 2009/0167095 A1 | 7/2009 | Rivas et al. | |

OTHER PUBLICATIONS

US 7,355,295, 04/2008, Rivas et al. (withdrawn)

\* cited by examiner

*Primary Examiner* — Gary L Laxton
(74) *Attorney, Agent, or Firm* — James McGinness, Esq.; Armstrong Teasdale LLP

(57) ABSTRACT

A power converter for a wind turbine including an array of switching devices and a control module having a current damping device. The control module is configured to control a switching behavior of the array of switching devices and to receive a current having a first frequency component from the wind turbine. The current damping device is configured to reduce an amplitude of the first frequency component.

25 Claims, 7 Drawing Sheets

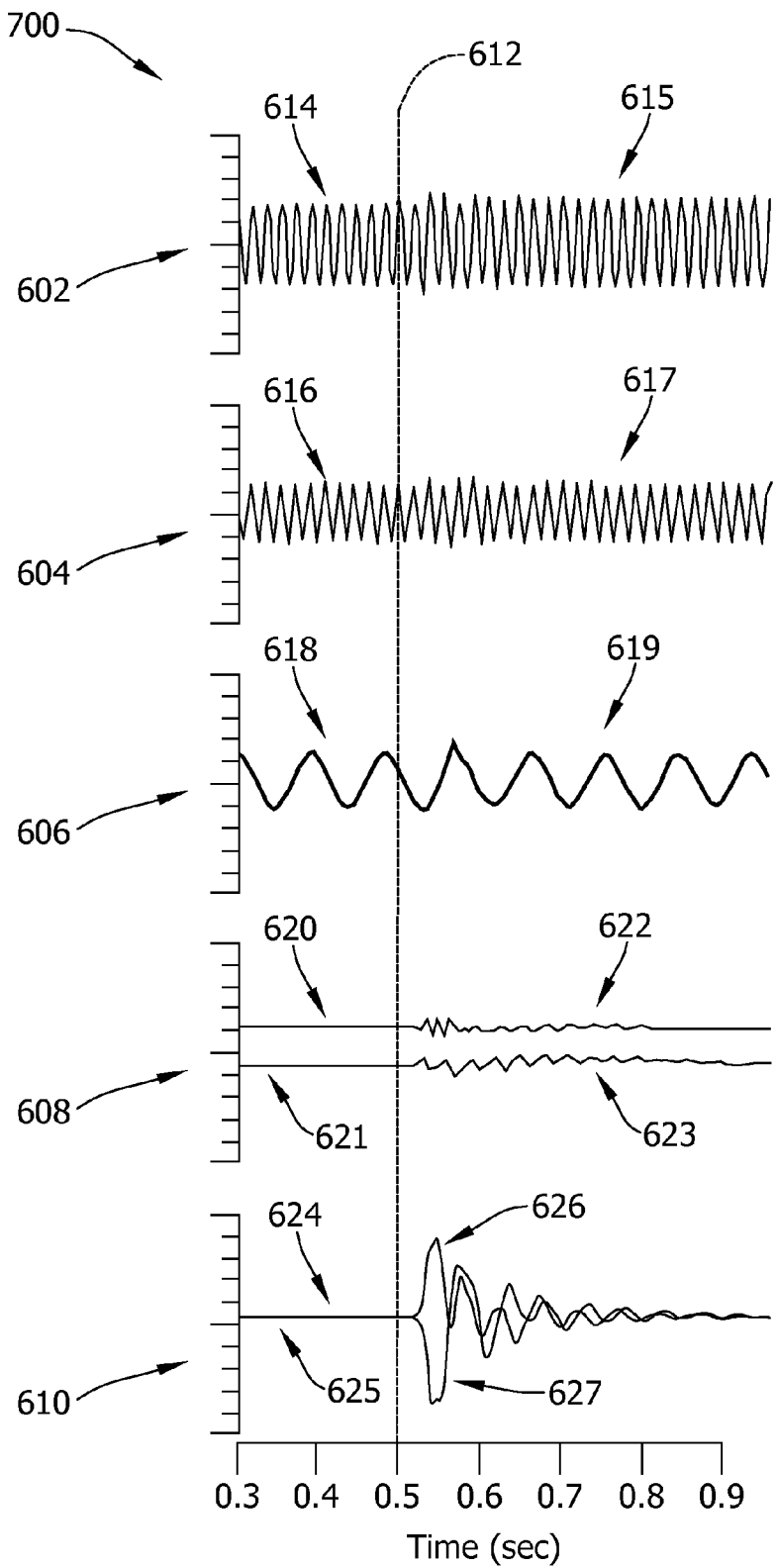

METHOD AND APPARATUS FOR GENERATING POWER IN A WIND TURBINE

BACKGROUND OF THE INVENTION

The subject matter described herein relates generally to wind turbines and, more particularly, to a method and apparatus for generating power in a wind turbine.

Generally, a wind turbine includes a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a tower.

Some wind turbine configurations include double-fed induction generators (DFIGs, also known as dual-fed asynchronous generators). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid. Alternatively, some wind turbine configurations include, without limitation, alternative types of induction generators, permanent magnet (PM) synchronous generators, electrically-excited synchronous generators, and switched reluctance generators. These alternative configurations may also include power converters that are used to convert the frequencies as described above and transmit electrical power between the utility grid and the generator.

At least some known electric utility grids include one or more series-compensated transmission lines. Such transmission lines often create subsynchronous resonance currents that may be lightly damped. When at least some known wind turbines are electrically coupled to such transmission lines, the wind turbines decrease the damping of the subsynchronous currents. As such, the subsynchronous currents may increase in amplitude and may cause a fault or "trip" to occur and render the wind turbine inoperable. Moreover, such subsynchronous currents may damage or otherwise shorten a lifespan of one or more components of the wind turbine and/or the electric utility grid.

BRIEF DESCRIPTION OF THE INVENTION

In one embodiment, a power converter for a wind turbine is provided that includes an array of switching devices and a control module that includes a current damping device. The control module is configured to control a switching behavior of the array of switching devices and to receive a current having a first frequency component from the wind turbine. The current damping device is configured to reduce an amplitude of the first frequency component.

In another embodiment, a wind turbine is provided that includes a generator and a power converter operatively coupled to the generator. The power converter includes an array of switching devices and a control module that includes a current damping device. The control module is configured to control a switching behavior of the array of switching devices and to receive a current having a first frequency component from the generator. The current damping device is configured to reduce an amplitude of the first frequency component.

In yet another embodiment, a method for converting power is provided that includes coupling a power converter to a generator and coupling a control module to the power converter, wherein the control module includes a current damping device. The method also includes receiving a current having a first frequency component from the generator and configuring the current damping device to reduce an amplitude of the first frequency component.

In another embodiment, a control module for a power converter is provided. The control module includes a current damping device. The current damping device is configured to receive a current having a subsynchronous frequency component, transform the current using a phasor-based reference frame, reduce an amplitude of the subsynchronous frequency component to substantially zero, and transform the current using a time-based reference frame.

In yet another embodiment, a control module for a power converter is provided. The control module includes an impedance feedforward module, a regulator module, and a current damping device. The current damping device is configured to receive a current having a subsynchronous frequency component from a generator and reduce an amplitude of the subsynchronous frequency component.

BRIEF DESCRIPTION OF THE DRAWINGS

FIG. 7 is a simulation of the power converter system shown in FIG. 3.

DETAILED DESCRIPTION OF THE INVENTION

Figure 1:
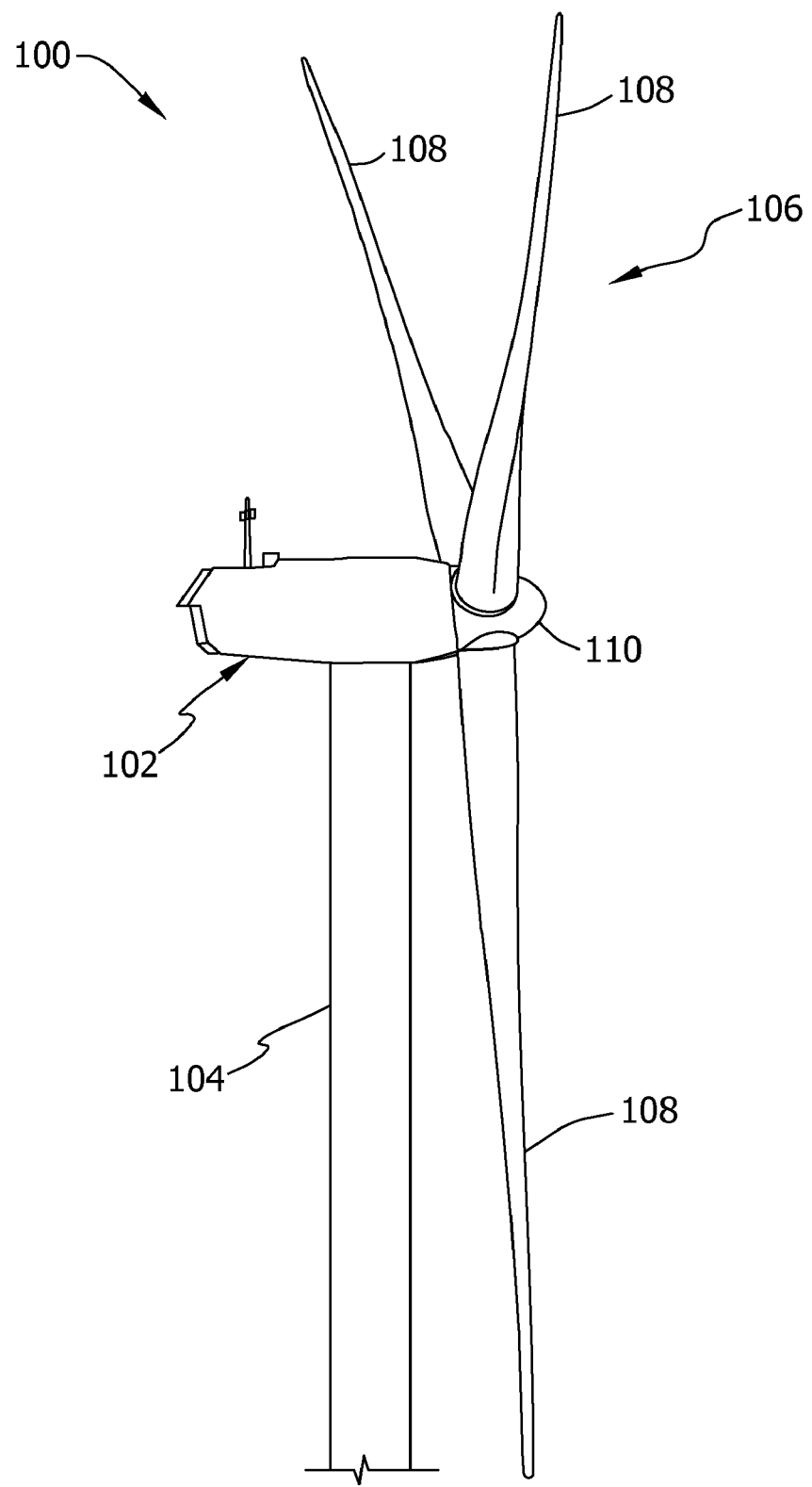
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitate operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
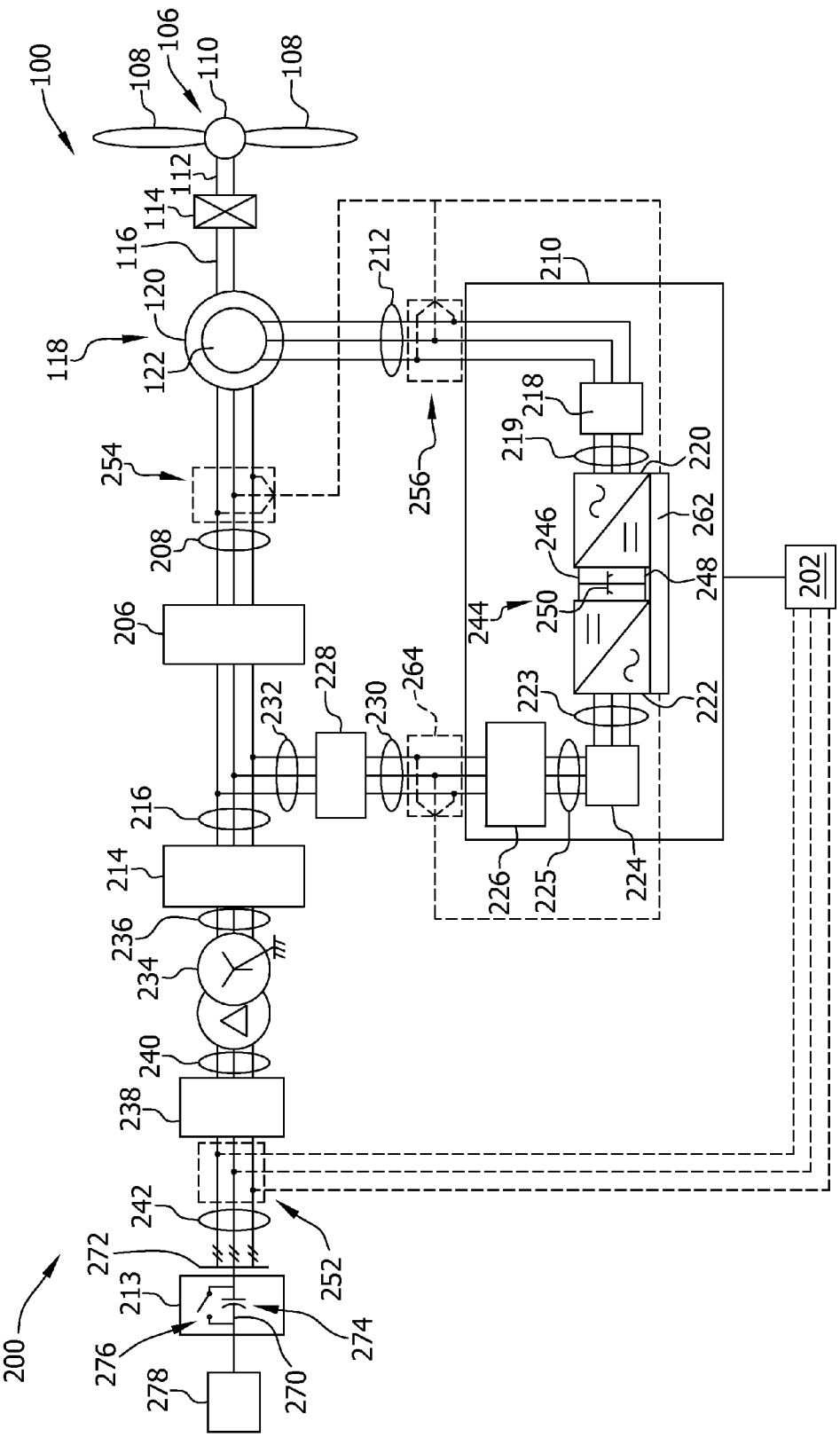
FIG. 2 is a schematic view of an exemplary electrical and control system that may be used with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) known in the art, wherein a full power conversion assembly (not shown in FIG. 2), that is similar in design and operation to power conversion assembly 210, is electrically coupled to generator stator 120, and such full power conversion assembly facilitates channeling electric power between generator stator 120 and an electric power transmission and distribution grid 213. In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 are used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 wherein any protection scheme (not shown) is configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to electric power transmission and distribution grid 213 via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to electric power transmission and distribution grid 213 via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252, including, but not limited to, one voltage and electric current measurement signal from one transducer.

As shown in FIG. 2, electrical and control system 200 also includes a converter controller 262 that is configured to receive a plurality of voltage and electric current measurement signals from a second set of voltage and electric current sensors 254 coupled in electronic data communication with stator bus 208, a third set of voltage and electric current measurement signals from a third set of voltage and electric current sensors 256 coupled in electronic data communication with rotor bus 212, and a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electric data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

In the exemplary embodiment, electric power transmission and distribution grid 213 includes one or more transmission lines 270 (only one shown for clarity) that are coupled to grid bus 242 via a grid coupling 272. Transmission lines 270 and/or electric power transmission and distribution grid 213 include one or more series compensation elements 274, such as one or more capacitors, to facilitate reducing reactive power losses within transmission lines 270. As described herein, series compensation elements 274 may create one or more subsynchronous resonances within electric power transmission and distribution grid 213. Transmission lines 270 and/or electric power transmission and distribution grid 213 also include one or more switches 276 coupled to each series compensation element 274. Switches 276 couple and decouple series compensation elements 274 to and from electric power transmission and distribution grid 213, respectively, as desired. More specifically, switches 276 are opened to couple series compensation elements 274 to electric power transmission and distribution grid 213, and switches 276 are closed to decouple series compensation elements 274 from electric power transmission and distribution grid 213. Electric power transmission and distribution grid 213 is operatively coupled to one or more loads 278 for providing power to loads 278.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to electric power transmission and distribution grid 213 via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 wherein the electrical power is modified for the rate of change of the output voltage associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 wherein line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when current flow is excessive and can damage the components of electrical and control system 200. Additional protection components are also provided, including line contactor 226, which may be controlled to form a disconnect by opening a switch (not shown in FIG. 2) corresponding to each of the lines of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 wherein rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating subsynchronous operation.

Power conversion assembly 210 is configured to receive control signals from turbine controller 202. The control signals are based on sensed conditions or operating characteristics of wind turbine 100 and electrical and control system 200, received by turbine controller 202 and used to control operation of power conversion assembly 210. Feedback from sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
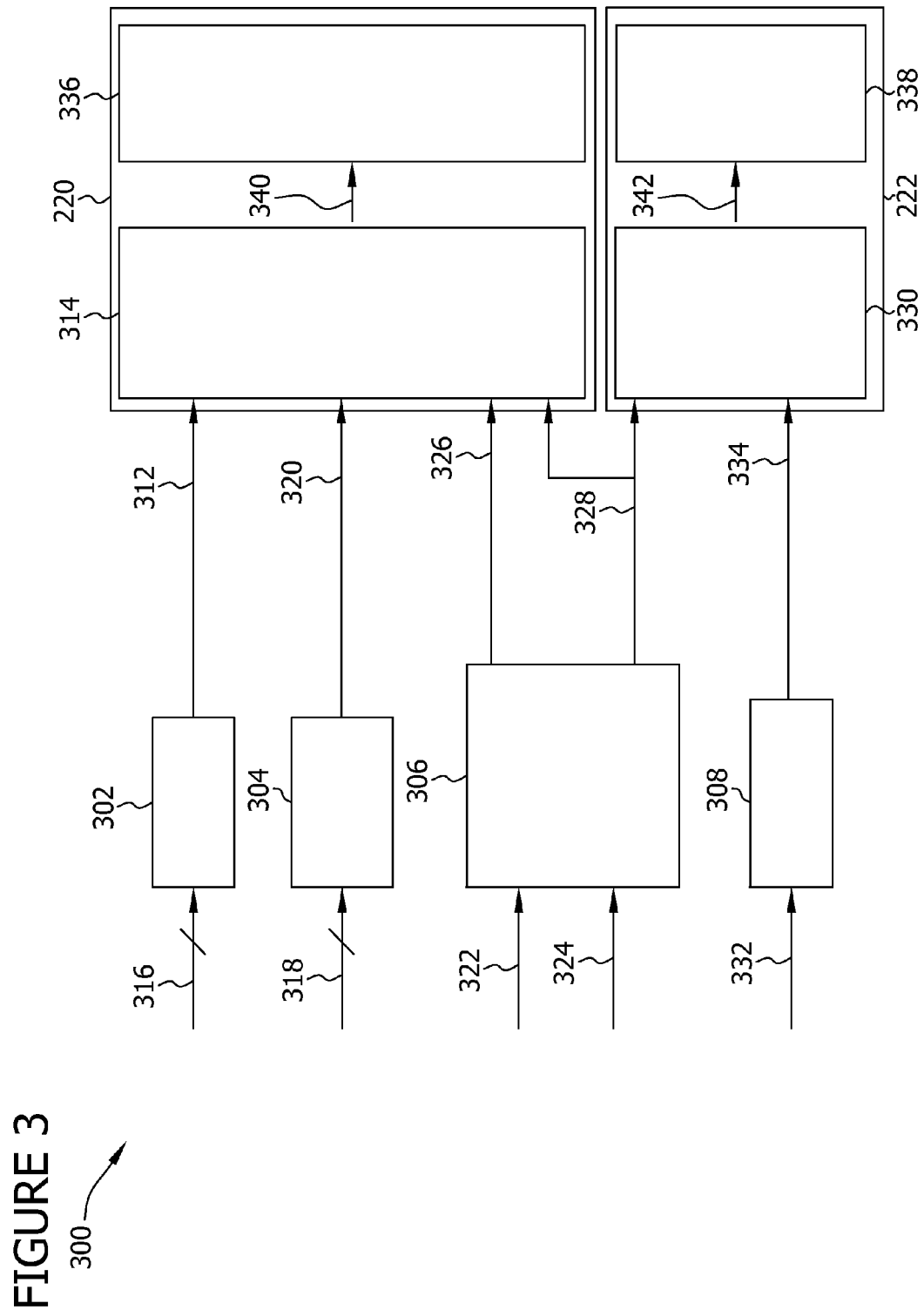
FIG. 3 is a block diagram of an exemplary power converter system that may be used with the electrical and control system shown in FIG. 2.

FIG. 3 shows an exemplary power converter system 300 that may be used with electrical and control system 200 (shown in FIG. 2). In the exemplary embodiment, power converter system 300 includes rotor-side power converter 220 and line-side power converter 222. Power converter system 300 also includes a torque regulator 302, a reactive power regulator 304, a synchronizing phase-locked loop (PLL) 306, and a DC voltage regulator 308.

Torque regulator 302 transmits a first rotor current command signal 312 to rotor-side power converter 220, and more specifically, to a rotor converter control module 314. First rotor current command signal 312 is used to adjust a rotor current based on a desired generator torque command signal 316 received from turbine controller 202 (shown in FIG. 2). Reactive power regulator 304 receives a stator voltage and reactive power command signal 318 from turbine controller 202 and transmits a second rotor current command signal 320 to rotor converter control module 314. Second rotor current command signal 320 is used to control a power factor of generator 118 (shown in FIG. 2) by adjusting a ratio of real power to reactive power of generator 118. In the exemplary embodiment, torque regulator 302 and reactive power regulator 304 are housed within converter controller 262 (shown in FIG. 2). In an alternative embodiment, torque regulator 302 and/or reactive power regulator 304 may be housed within another suitable controller, such as turbine controller 202.

Synchronizing PLL 306 receives a rotor position feedback signal 322 from a rotor position sensor (not shown) and a stator voltage feedback signal 324 from second set of voltage and electric current sensors 254 (shown in FIG. 2). Synchronizing PLL 306 determines a transformation angle signal 326 and a reference angle signal 328 that are used to transform rotor voltages and rotor currents between two or more signal reference frames, such as a time-based reference frame and a phasor-based reference frame. In one embodiment, transformation angle signal 326 and reference angle signal 328 are used to transform rotor voltages and rotor currents to one or more phasors that include X and Y components of the rotor voltages and/or rotor currents. As used herein, an X component refers to a real component of a phasor, and a Y component refers to an imaginary component of a phasor. Transformation angle signal 326 and reference angle signal 328 are transmitted to rotor converter control module 314 and to a line converter control module 330 that is positioned within line-side power converter 222. DC voltage regulator 308 receives a DC voltage reference signal 332 that is set, for example, during wind turbine commissioning, and transmits a line current command signal 334 to line converter control module 330. Line current command signal 334 is used to adjust a DC voltage of DC link 244 (shown in FIG. 2).

Rotor converter control module 314 is coupled to a rotor converter switching array 336, and line converter control module 330 is coupled to a line converter switching array 338. In the exemplary embodiment, rotor converter switching array 336 and line converter switching array 338 each includes a plurality of IGBT switching devices (not shown). Alternatively, rotor converter switching array 336 and/or line converter switching array 338 include any suitable switching devices that enable rotor-side power converter 220 and line-side power converter 222 to operate as described herein. In the exemplary embodiment, rotor converter control module 314 and line converter control module 330 use pulse-width modulation to control a duty cycle of a rotor converter switch control signal 340 and of a line converter switch control signal 342, respectively. Rotor converter switch control signal 340 controls a switching behavior of rotor converter switching array 336, and line converter switch control signal 342 controls a switching behavior of line converter switching array 338. As such, rotor converter switching array 336 and line converter switching array 338 are controlled to produce one or more desired rotor and/or stator voltage and/or current characteristics.

Although not shown in FIG. 3, one or more control components of power converter system 300 receive one or more feedback signals to facilitate maintaining proper operation of power converter system 300. Such feedback signals include, without limitation, a DC voltage signal, a 3 phase rotor current signal (such as from third set of voltage and electric current sensors 256), a 3 phase stator current signal (such as from second set of voltage and electric current sensors 254), a 3 phase line current signal (such as from fourth set of voltage and electric current sensors 264), a 3 phase stator voltage signal (such as from second set of voltage and electric current sensors 254), and/or a rotor position signal.

Figure 4:
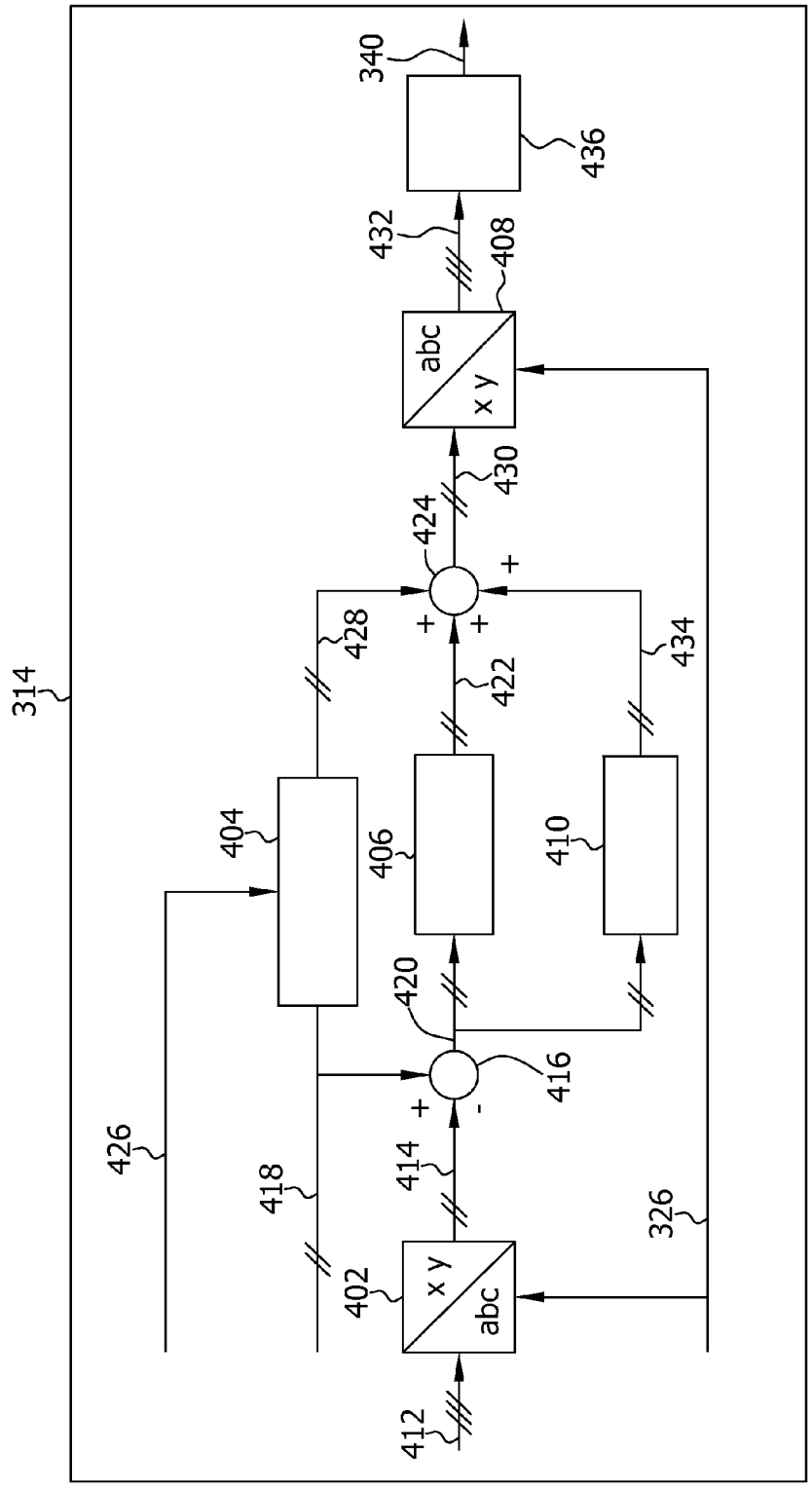
FIG. 4 is a block diagram of an exemplary rotor converter control module that may be used with the power converter system shown in FIG. 3.

FIG. 4 schematically shows rotor converter control module 314 that may be used with power converter system 300 (shown in FIG. 3). In the exemplary embodiment, rotor converter control module 314 includes a current transform module 402, an impedance feedforward module 404, a regulator module 406, a voltage transform module 408, and a current damping device 410.

Current transform module 402 receives a current feedback signal 412 that includes current measurements from third set of electric current sensors 256 (shown in FIG. 2) of each phase of rotor bus 212 (shown in FIG. 2). In the exemplary embodiment, current feedback signal 412 includes one or more current components from electric power transmission and distribution grid 213 via power converter system 300 and/or via generator 118 (shown in FIG. 2). In one embodiment, one or more current components may include, for example, one or more subsynchronous current frequency components and/or one or more grid frequency components that substantially conforms to a frequency of electric power transmission and distribution grid 213. Current transform module 402 receives transformation angle signal 326 and transforms the three-phase instantaneous currents of current feedback signal 412 into a phasor-based reference frame. Current transform module 402 transmits a current feedback phasor 414 to a current feedback comparator 416. Current feedback comparator 416 receives a current command phasor 418, which includes first rotor current command signal 312 and second rotor current command signal 320 (both shown in FIG. 2), and calculates a difference between current feedback phasor 414 and current command phasor 418. Current feedback comparator 416 transmits the resulting difference as a current error phasor 420 to regulator module 406 and to current damping device 410.

Regulator module 406 receives current error phasor 420 and performs proportional plus integral feedback regulation to adjust an output of regulator module 406 to facilitate reducing an error of current error phasor 420 to substantially 0. Regulator module 406 transmits a resulting regulator output phasor 422, which is a voltage phasor signal, to a regulator adder 424.

Impedance feedforward module 404 receives current command phasor 418 and a slip frequency signal 426. Impedance feedforward module 404 computes an amplitude of a feedforward command phasor 428 as a feedforward voltage phasor signal to supplement a closed-loop current regulation of regulator module 406.

In the exemplary embodiment, current damping device 410 receives current error phasor 420 and facilitates reducing an amplitude of one or more current frequency components represented by current error phasor 420. In the exemplary embodiment, the one or more current frequency components are subsynchronous to a current frequency of electric power transmission and distribution grid 213 (shown in FIG. 2). As used herein, the term "subsynchronous" refers to a frequency that is less than a reference frequency, and in certain embodiments, a frequency that is less than the frequency of electric power transmission and distribution grid 213. Current damping device 410 transmits a resulting damping control phasor 434, which is a voltage phasor signal, to regulator adder 424.

Regulator adder 424 combines regulator output phasor 422, feedforward command phasor 428, and damping control phasor 434, and transmits a resulting voltage command phasor 430 to voltage transform module 408. Voltage transform module 408 transforms voltage command phasor 430 to a time-based reference frame using transformation angle signal 326, and outputs a resulting three-phase sinusoidal voltage command signal 432. Voltage command signal 432 is modulated by a pulse-width modulation (PWM) module 436. PWM module 436 transmits rotor converter switch control signal 340 to rotor converter switching array 336 (shown in FIG. 2) to control a switching operation, such as a duty cycle, of the switching devices within rotor converter switching array 336.

Figure 5:
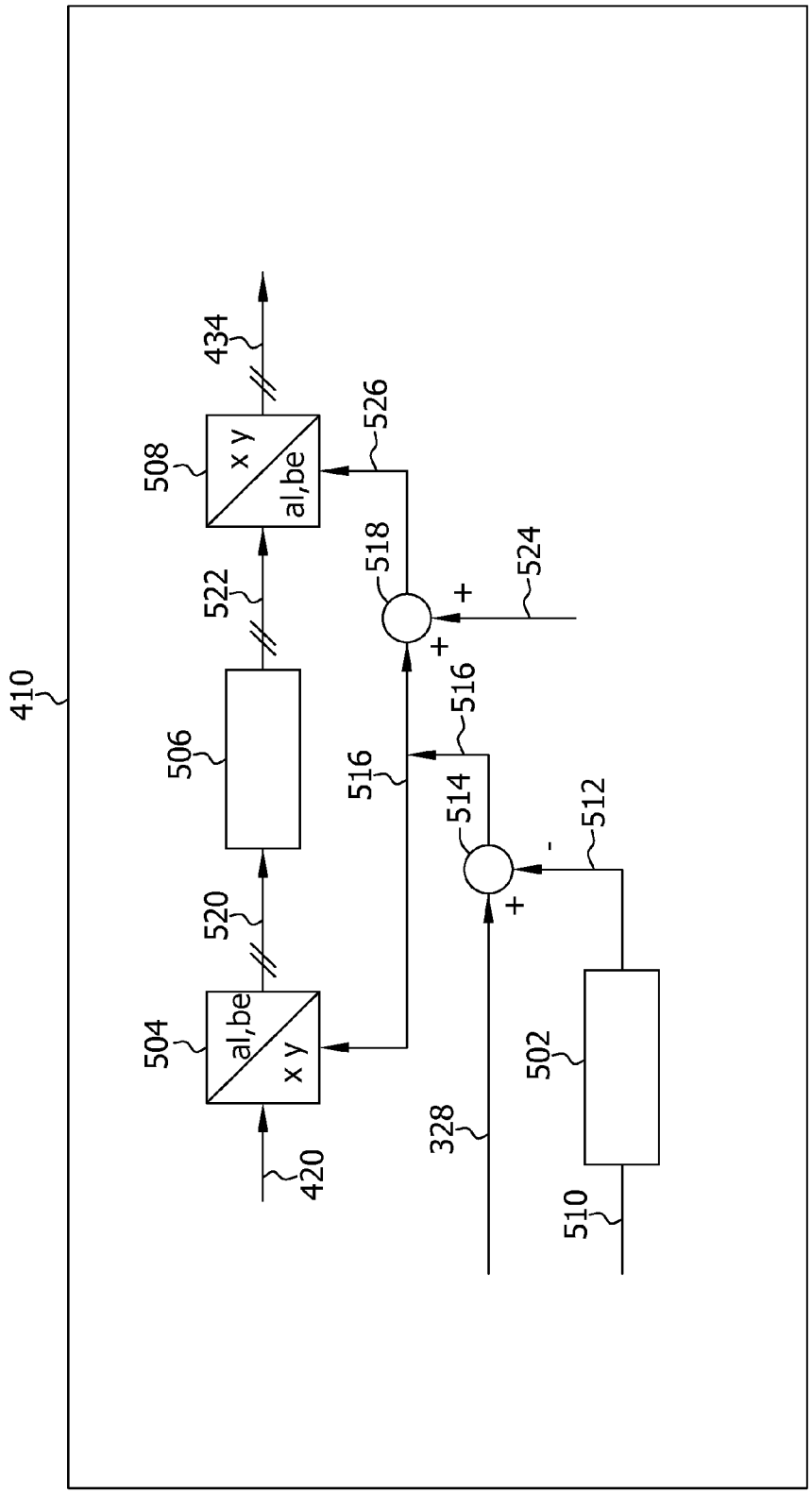
FIG. 5 is a block diagram of an exemplary current damping device that may be used with the rotor converter control module shown in FIG. 4.

FIG. 5 schematically shows a portion of current damping device 410 that may be used with rotor converter control module 314 (shown in FIG. 3). In the exemplary embodiment, current damping device 410 includes an integrator module 502, an input transform module 504, one or more subsynchronous damping control (SSDC) regulator modules 506, and an output transform module 508. Integrator module 502 receives a predetermined subsynchronous frequency signal 510 that, in one embodiment, represents one or more predetermined subsynchronous current frequencies to be damped. Subsynchronous frequency signal 510 is selected as a frequency of a reference frame upon which the subsynchronous frequency of the grid resonance is acted upon by SSDC regulator module 506. In one embodiment, the reference frame may have a substantially zero frequency, such that a frequency of one or more signals entering SSDC regulator module 506 will be equal to a frequency of signals seen from a stationary reference frame. In another embodiment, the reference frame may be selected to rotate near an anticipated frequency of the subsynchronous grid resonance. Selection of the appropriate subsynchronous frequency signal 510 is dependent upon the remainder of the system in which current damping device 410 is embedded, and is done during design studies for tuning the subsynchronous damping feature of the system.

Integrator module 502 integrates subsynchronous frequency signal 510 and transmits a resulting subsynchronous angle signal 512 to a reference angle comparator 514. Reference angle comparator 514 calculates a difference between subsynchronous angle signal 512 and reference angle signal 328, and outputs a resulting subsynchronous reference angle signal 516 to input transform module 504 and to a subsynchronous orientation adder 518.

Input transform module 504 receives current error phasor 420, and performs a transformation of current error phasor 420 using subsynchronous reference angle signal 516. More specifically, input transform module 504 transforms current error phasor 420 into a rotating reference frame that includes two components, α and β, using the following equations:

$$\alpha = x^* \cos\theta + y^* \sin\theta \quad \text{(Eq. 1)}$$

$$\beta = x^* = \sin\theta + y^* \cos\theta \quad \text{(Eq. 2)}$$

where x is a real component of current error phasor 420, y is an imaginary component of current error phasor 420, and θ is subsynchronous reference angle signal 516. The rotating reference frame that includes α and β rotates substantially at the frequency of the subsynchronous current frequency. Input transform module 504 transmits a current error transform signal 520 that includes α and β to SSDC regulator module 506. Current error transform signal 520 includes a frequency component that is substantially equal to the subsynchronous current frequency. In the exemplary embodiment, SSDC regulator module 506 includes, and/or is configured to perform, a proportional-plus-integral transfer function. Alternatively, SSDC regulator module 506 includes any suitable transfer function or other algorithm that enables current damping device 410 to operate as described herein. SSDC regulator module 506 integrates and adds a gain to current error transform signal 520. SSDC regulator module 506 transmits a resulting current subsynchronous damping transform signal 522 to output transform module 508. Subsynchronous damping transform signal 522 includes a frequency component that is substantially equal to the subsynchronous current frequency.

Subsynchronous orientation adder 518 combines subsynchronous reference angle signal 516 with an orientation adjustment reference signal 524, and transmits a resulting output orientation signal 526 to output transform module 508. Selection of orientation adjustment reference signal 524 is dependent upon the remainder of the system in which current damping device 410 is embedded, and is done during design studies for tuning the subsynchronous damping feature of the system. Output orientation signal 526 is used to adjust an orientation of an output phasor generated by output transform module 508. Output transform module 508 transforms current subsynchronous damping transform signal 522 to a phasor-based reference frame, in a substantially inverse manner as is performed by input transform module 504. As such, an inverse of Eq. 1 is performed on an α component of subsynchronous damping transform signal 522, and an inverse of Eq. 2 is performed on a β component of subsynchronous damping transform signal 522. Output transform module 508 outputs a resulting damping control phasor 434 as shown in FIG. 4. Damping control phasor 434 includes a frequency component that is substantially equal to a difference between the frequency of electric power transmission and distribution grid 213 and the subsynchronous current frequency.

Figure 6:
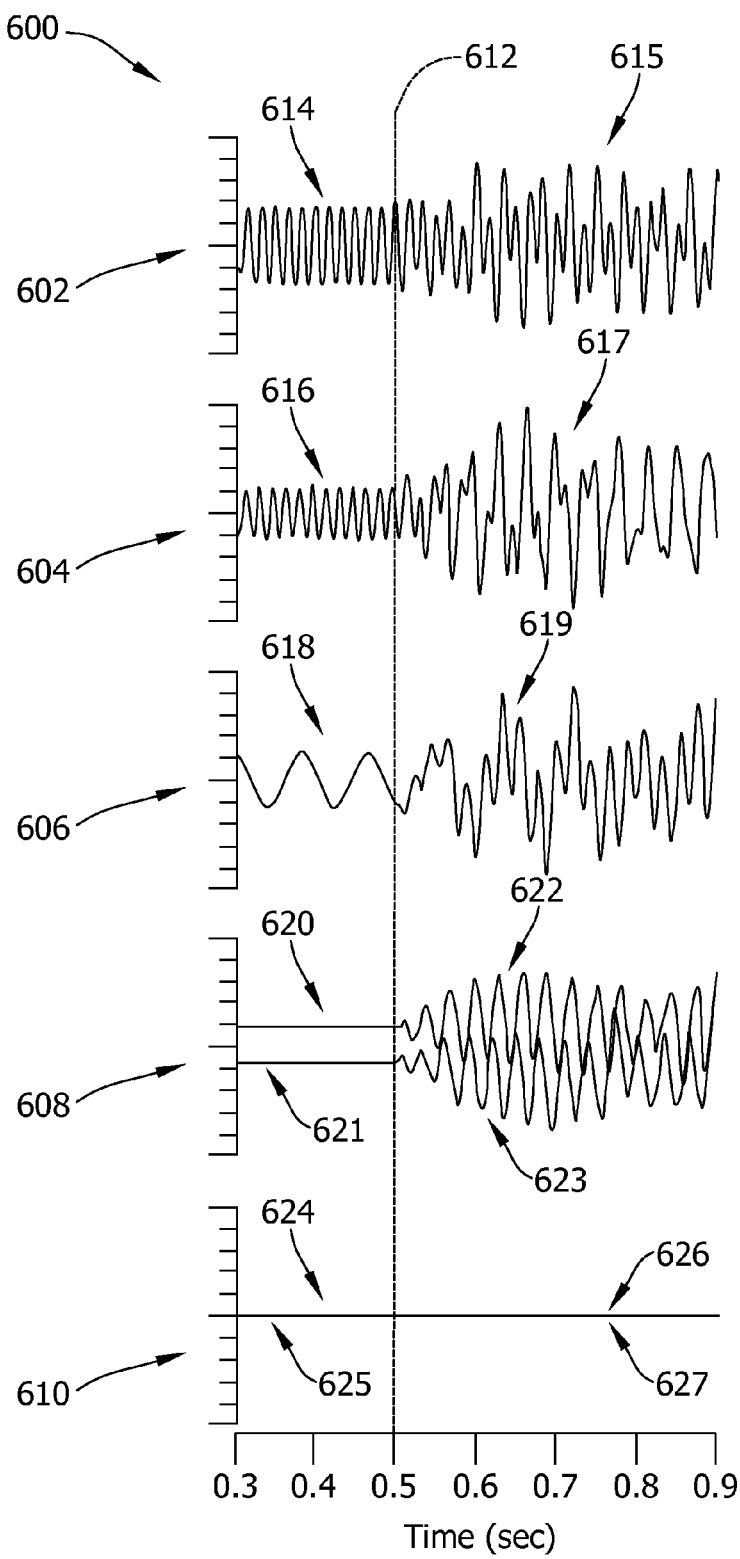
FIG. 6 is a simulation of an alternative power converter system that may be used with the electrical and control system shown in FIG. 2.

FIG. 6 is a simulation 600 of an alternative power converter system (not shown). The alternative power converter system is substantially similar to power converter system 300 (shown in FIG. 3), and similar reference numerals are used to represent similar components, except that the alternative power converter system does not include current damping device 410 (shown in FIG. 4). Simulation 600 includes a grid voltage graph 602, a stator current graph 604, a rotor current graph 606, a rotor current phasor graph 608, and an SSDC phasor graph 610. Although the alternative power system does not include current damping device 410, SSDC phasor graph 610 is provided for completeness.

Simulation 600 includes a switching event 612 that involves an opening of switch 276 (shown in FIG. 2). Although FIG. 6 illustrates switching event 612 occurring at 0.5 seconds, switching event 612 may occur at any suitable time. Before switching event 612 occurs, switch 276 is closed, and series compensation element 274 (shown in FIG. 2) is decoupled from electric power transmission and distribution grid 213 (shown in FIG. 2). When switching event 612 occurs, switch 276 is opened and series compensation element 274 is coupled to electric power transmission and distribution grid 213. When series compensation element 274 is coupled to electric power transmission and distribution grid 213, series compensation element 274 creates a resonant circuit with electric power transmission and distribution grid 213 and/or with electrical and control system 200 (shown in FIG. 2). As such, one or more subsynchronous frequencies are created within electric power transmission and distribution grid 213 and/or within electrical and control system 200. FIG. 6 illustrates a subsynchronous frequency of about 25 Hz that is created within the alternative power converter system. However, the subsynchronous frequencies can include any frequency that is lower than the frequency of electric power transmission and distribution grid 213.

One skilled in the art will recognize that a frequency of a trace within simulation 600 may be obtained by counting a number of peaks of the trace and dividing the number of peaks by the time period between the first peak and the last peak counted. However, simulation 600 is provided to illustrate amplitude and frequency relationships of signals represented by the traces of the graphs, rather than to show discrete values of the signal amplitudes and/or frequencies.

Grid voltage graph 602 includes a trace 614 that represents a single phase of a grid voltage, such as a voltage measured at grid bus 242 (shown in FIG. 2). As shown in FIG. 6, before switching event 612 occurs, the grid voltage oscillates at a substantially steady state frequency of about 60 Hertz (Hz) with a substantially steady state amplitude. Alternatively, the grid voltage may oscillate at a substantially steady state frequency of about 50 Hz, or at any suitable frequency. After switching event 612 occurs, series compensation element 274 introduces a subsynchronous voltage frequency to grid bus 242 that alters a voltage frequency and a voltage amplitude of grid bus 242. As such, after switching event 612 occurs, a trace 615 represents a combination of the voltage of grid bus 242 and the subsynchronous voltage frequency.

Stator current graph 604 includes a trace 616 that represents a single phase of a current of generator stator 120 (shown in FIG. 2) that is measured by, for example, second set of voltage and electric current sensors 254 (shown in FIG. 2). As shown in FIG. 6, before switching event 612 occurs, the current of generator stator 120 oscillates at a substantially steady state frequency of about 60 Hz with a substantially steady state amplitude. Alternatively, the current of generator stator 120 may oscillate at a substantially steady state frequency of about 50 Hz, or at any suitable frequency. After switching event 612 occurs, series compensation element 274 introduces a subsynchronous current frequency to generator stator 120 that alters the current frequency and the current amplitude of generator stator 120. As such, after switching event 612 occurs, a trace 617 represents a combination of the current of generator stator 120 and the subsynchronous current frequency.

Rotor current graph 606 includes a trace 618 that represents a single phase of a current (also labeled in FIG. 4 as current feedback signal 412) of generator rotor 122 (shown in FIG. 2) that is measured by, for example, third set of voltage and electric current sensors 256 (shown in FIG. 2). As shown in FIG. 6, before switching event 612 occurs, the current of generator rotor 122 may oscillate at a substantially steady state frequency of about 12 Hz with a substantially steady state amplitude. The current frequency of generator rotor 122, also known as a slip frequency, depends on a rotational speed of rotor 106 (shown in FIG. 2) as well as other operating conditions of wind turbine 100. As such, the current of generator rotor 122 may oscillate at any suitable frequency. After switching event 612 occurs, series compensation element 274 introduces a subsynchronous current frequency to generator rotor 122 that alters the current frequency and the current amplitude of generator rotor 122. As such, after switching event 612 occurs, a trace 619 represents a combination of the current of generator rotor 122 and the subsynchronous current frequency.

Rotor current phasor graph 608 includes a first trace 620 and a second trace 621 that represent an X component and a Y component, respectively, of a rotor current phasor, such as current feedback phasor 414 (shown in FIG. 4). As shown in FIG. 6, before switching event 612 occurs, the X component and the Y component of current feedback phasor 414 are maintained at substantially steady state levels. After switching event 612 occurs, a third trace 622 and a fourth trace 623 represent the X component and the Y component, respectively, of current feedback phasor 414. The X component and the Y component of current feedback phasor 414 oscillate at a frequency that is equal to the frequency of electric power transmission and distribution grid 213 minus a subsynchronous current frequency introduced by series compensation element 274. Although FIG. 6 shows an oscillation frequency of the X component and the Y component of current feedback phasor 414 as being about 35 Hz, the oscillation frequency may be any suitable frequency as determined by the frequency of electric power transmission and distribution grid 213 and the subsynchronous current frequency introduced by series compensation element 274.

SSDC phasor graph 610 includes a first trace 624 and a second trace 625 that represent an X component and a Y component, respectively, of a damping control phasor, such as damping control phasor 434 (shown in FIG. 4). A third trace 626 and a fourth trace 627 represent the X component and the Y component, respectively, of damping control phasor 434 after switching event 612 occurs. However, as the alternative power converter system does not include current damping device 410, first trace 624, second trace 625, third trace 626, and fourth trace 627 of SSDC phasor graph 610 represent a substantially 0 amplitude.

FIG. 7 is a simulation 700 of power converter system 300 (shown in FIG. 3) that includes current damping device 410 (shown in FIG. 4). Simulation 700 includes substantially similar components as simulation 600, and similar reference numerals are used to represent similar components. As such, simulation 700 includes a grid voltage graph 602, a stator current graph 604, a rotor current graph 606, a rotor current phasor graph 608, and an SSDC phasor graph 610.

Simulation 700 illustrates similar behavior of grid voltage graph 602, stator current graph 604, rotor current graph 606, rotor current phasor graph 608 as simulation 600, except that a damping of the subsynchronous current shown in FIG. 6 can be seen after switching event 612 occurs.

SSDC phasor graph 610 includes first trace 624 and second trace 625 that represent an X component and a Y component, respectively, of damping control phasor 434 (shown in FIG. 4) before switching event 612 occurs, and third trace 626 and fourth trace 627 that represent the X component and the Y component, respectively, of damping control phasor 434 after switching event 612 occurs. As shown in FIG. 7, before switching event 612 occurs, the X component and the Y component of damping control phasor 434 are maintained at substantially steady state levels. After switching event 612 occurs, the X component and the Y component of damping control phasor 434 exhibit decreasing amplitudes as time progresses, until the X component and the Y component stabilize at a substantially 0 amplitude.

An operation of SSDC regulator module 506 causes the subsynchronous resonances in electrical and control system 200 to be rapidly damped, thereby enabling continued operation with a reduced risk of damage to components of electrical and control system 200. Moreover, SSDC regulator module 506 and current damping device 410 facilitate reducing an amplitude of one or more subsynchronous current frequency components while substantially maintaining an amplitude of the frequency of electric power transmission and distribution grid 213. An operation of SSDC regulator module 506 and current damping device 410 facilitates adjusting a voltage of generator rotor 120 to reduce an amplitude of one or more oscillations introduced by series compensation element 274. SSDC regulator module 506 and current damping device 410 present a positive resistance characteristic to electric power transmission and distribution grid 213 that reduces subsynchronous frequency components within electric and control system 200 and/or electric power transmission and distribution grid 213. In one embodiment, the frequency of electric power transmission and distribution grid 213 is about 60 Hz. Alternatively, the frequency of electric power transmission and distribution grid 213 is about 50 Hz, or any suitable frequency.

The above-described embodiments facilitate providing an efficient and cost-effective power converter. The power converter damps, or reduces oscillations of, subsynchronous currents that may be present within the power converter and/or an electric utility grid. As such, the wind turbine described herein may be coupled to the electric utility grid while minimizing damage to the wind turbine and/or to one or more electric utility grid components that may result from otherwise undamped subsynchronous current resonances. More specifically, the embodiments described herein enable a wind turbine with a double-fed induction generator to be coupled to an electric utility grid that includes one or more series-compensated transmission lines.

Exemplary embodiments of a wind turbine, power converter, and methods of converting power are described above in detail. The methods, wind turbine, and power converter are not limited to the specific embodiments described herein, but rather, components of the wind turbine, components of the power converter, and/or steps of the methods may be utilized independently and separately from other components and/or steps described herein. For example, the power converter and methods may also be used in combination with other wind turbine power systems and methods, and are not limited to practice with only the power system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power converter for a wind turbine, said power converter comprising:
    an array of switching devices; and, a control module comprising a current damping device, said control module configured to:
control a switching behavior of said array of switching devices; and,
receive a current having a first frequency component and a second frequency component different from the first frequency component from the wind turbine, said current damping device configured to reduce an amplitude of the first frequency component and to substantially maintain an amplitude of the second frequency component.

2. A power converter in accordance with claim 1, wherein the first frequency component is subsynchronous with respect to a reference frequency.

3. A power converter in accordance with claim 1, wherein the second frequency component is substantially equal to a frequency of an electrical power transmission and distribution grid.

4. A power converter in accordance with claim 1, wherein said current damping device is configured to perform a proportional-integral transfer function.

5. A power converter in accordance with claim 1, wherein said control module is further configured to control a duty cycle of said array of switching devices.

6. A wind turbine, comprising:
a generator; and,
a power converter operatively coupled to said generator, said power converter comprising:
an array of switching devices; and,
a control module comprising a current damping device, said control module configured to:
control a switching behavior of said array of switching devices; and,
receive a current having a first frequency component and a second frequency component that is different from the first frequency component from said generator, said current damping device configured to reduce an amplitude of the first frequency component and to substantially maintain an amplitude of the second frequency component.

7. A wind turbine in accordance with claim 6, wherein the first frequency component is subsynchronous with respect to the second frequency component.

8. A wind turbine in accordance with claim 6, wherein the second frequency component is substantially equal to a frequency of an electrical power transmission and distribution grid.

9. A wind turbine in accordance with claim 6, wherein said current damping device is configured to perform a proportional-integral transfer function.

10. A wind turbine in accordance with claim 6, wherein said control module is further configured to control a duty cycle of said array of switching devices.

11. A method for converting power, said method comprising:
coupling a power converter to a generator;
coupling a control module to the power converter, the control module including a current damping device;
receiving a current having a first frequency component and a second frequency component that is different from the first frequency component from the generator; and,
configuring the current damping device to reduce an amplitude of the first frequency component and to substantially maintain an amplitude of the second frequency component.

12. A method in accordance with claim 11, wherein the second frequency component is subsynchronous to the first frequency component.

13. A method in accordance with claim 11, wherein the second frequency component is substantially equal to a frequency of an electrical power transmission and distribution grid.

14. A method in accordance with claim 11, further comprising configuring the current damping device to perform a proportional-integral transfer function.

15. A control module for a power converter, said control module comprising:
a current damping device configured to:
receive a current having a subsynchronous frequency component;
transform the current using a phasor-based reference frame;
reduce an amplitude of the subsynchronous frequency component to substantially zero; and,
transform the current using a time-based reference frame.

16. A control module in accordance with claim 15, wherein said current damping device is further configured to receive the current from a generator of a wind turbine.

17. A control module in accordance with claim 15, wherein the current has a grid frequency component that conforms to a frequency of an electric power transmission and distribution grid, said current damping device is further configured to substantially maintain an amplitude of the grid frequency component.

18. A control module for a power converter, said control module comprising:
an impedance feedforward module;
a regulator module; and,
a current damping device configured to:
receive a current having a first frequency component and a second frequency component from a generator, wherein the first frequency component is subsynchronous to the second frequency component; and,
reduce an amplitude of the first frequency component and maintain an amplitude of the second frequency component.

19. A control module in accordance with claim 18, wherein said current damping device is further configured to perform a proportional-integral transfer function on the first frequency component.

20. A control module in accordance with claim 18, wherein each of said impedance feedforward module, said regulator module, and said current damping device are configured to output a voltage phasor signal to a regulator adder configured to add the voltage phasors.

21. A power converter for a wind turbine, said power converter comprising:
a plurality of switching devices; and,
a control module comprising a current damping device, said control module configured to:
control a switching behavior of said plurality of switching devices; and,
receive a current having a first frequency component and a second frequency component different from the first frequency component, said current damping device configured to reduce an amplitude of the first frequency component and to substantially maintain an amplitude of the second frequency component.

22. A control module in accordance with claim 21, wherein the second frequency component conforms to a frequency of an electric power transmission and distribution grid, and the first frequency component is subsynchronous with respect to the second frequency component.

23. A control module in accordance with claim 21, wherein the wind turbine includes a generator rotor, said current damping device is configured to adjust a voltage of the generator rotor to reduce the amplitude of the first frequency component.

24. A control module in accordance with claim 23, wherein said current damping device uses at least one of a real component and an imaginary component of a voltage signal to adjust the voltage of the generator rotor.

25. A control module in accordance with claim 21, wherein said current damping device uses at least one of a real component and an imaginary component of the current to reduce the amplitude of the first frequency component.

* * * * *